US012248935B2

(12) United States Patent
Fletcher

(10) Patent No.: US 12,248,935 B2
(45) Date of Patent: *Mar. 11, 2025

(54) SYSTEMS AND METHODS FOR CONDUCTING REMOTE USER AUTHENTICATION

(71) Applicant: Capital One Services, LLC, McLean, VA (US)

(72) Inventor: Abel Fletcher, Prosper, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,763

(22) Filed: Dec. 22, 2023

(65) Prior Publication Data
US 2024/0202720 A1    Jun. 20, 2024

Related U.S. Application Data

(63) Continuation of application No. 17/494,737, filed on Oct. 5, 2021, now Pat. No. 11,854,008.

(51) Int. Cl.
*G06Q 20/40*    (2012.01)
*G06F 21/35*    (2013.01)

(52) U.S. Cl.
CPC ........... *G06Q 20/401* (2013.01); *G06F 21/35* (2013.01)

(58) Field of Classification Search
CPC .............................. G06Q 20/401; G06F 21/35
See application file for complete search history.

(56) References Cited

U.S. PATENT DOCUMENTS 9,807,610 B2    10/2017    Rasheed et al.
10,296,897 B1*   5/2019    Wu ..................... G06Q 20/354
(Continued)

FOREIGN PATENT DOCUMENTS

CN    110661800 A    1/2020
SG    10202101039 T    3/2021

OTHER PUBLICATIONS

"How can I make a browser extension payments systems?" Stack Overflow, dated Jun. 2021 https://stackoverflow.com/questions/64007559/how-can-i-make-a-browser-extension-payments-system (Year: 2021).*
"Multifactor authentication methods, use cases and products" TechTarget, dated Jan. 2019 https://www.techtarget.com/searchsecurity/feature/The-fundamentals-of-MFA-Procuring-multifactor-authentication?Offer=abt_pubpro_AI-Insider (Year: 2019).*
(Continued)

*Primary Examiner* — Raven E Yono
(74) *Attorney, Agent, or Firm* — TROUTMAN PEPPER LOCKE LLP; Christopher J. Forstner; John A. Morrissett

(57) ABSTRACT

Disclosed embodiments may include a system that may receive, from a user device associated with a user, authentication rule(s), each authentication rule associated with respective merchant(s) and comprising respective required authentication factor(s) for completing a transaction with the respective merchant(s). The system may identify a user has navigated to a merchant webpage and may determine at least one rule of the authentication rule(s) associated with the merchant. The system may identify first required authentication factor(s) corresponding to the at least one rule, and may cause the user device to display, via a GUI, the first required authentication factor(s). The system may receive, via the user device, authentication information associated with the user. The system may determine whether the authentication information satisfies the first required authentication factor(s). Responsive to making that determination, the system may enable the user to complete a transaction via the merchant webpage.

18 Claims, 5 Drawing Sheets

(56) References Cited

U.S. PATENT DOCUMENTS

| | | | |
|---|---|---|---|
| 10,313,341 B2 | 6/2019 | Stoops et al. | |
| 10,681,547 B1 | 6/2020 | Yang | |
| 2011/0117999 A1 | 5/2011 | Anderson et al. | |
| 2012/0179558 A1* | 7/2012 | Fischer | G06Q 20/20 705/16 |
| 2015/0127530 A1* | 5/2015 | Wick | G06Q 20/386 705/39 |
| 2018/0047018 A1* | 2/2018 | De Ganon | G06Q 20/401 |
| 2018/0375659 A1 | 12/2018 | Kozma et al. | |
| 2020/0143375 A1* | 5/2020 | Gurunathan | G06Q 20/409 |
| 2020/0193443 A1* | 6/2020 | Piel | G06N 20/00 |
| 2020/0288315 A1 | 9/2020 | Hanley et al. | |
| 2021/0125262 A1 | 4/2021 | Corrieri et al. | |
| 2021/0272115 A1* | 9/2021 | Muchang | G06Q 20/40145 |

OTHER PUBLICATIONS

"Why E-Commerce Retailers Need to Start Thinking About MFA," Medium, dated Mar. 12, 2019 https://medium.com/bidipass/why-e-commerce-retailers-need-to-start-thinking-about-mfa-bd7cb34336e (Year: 2019).*

Anonymous: "Multi-factor authentication—Wikipedia," pp. 1-12, retrieved from URL: https://en.wikipedia.org/w/index.php?title=Multi-factor_authentication&oldid=1042568913 (Sep. 5, 2021).

Extended European Search Report in related EP Application No. EP22199415.5, mailed Feb. 28, 2023.

"How can I make a browser extension payments system?" Stack Overflow, dated Jun. 2021 https://stackoverflow.com/questions/64007559/how-can-i-make-a-browser-extension-payments-system (Year: 2021).

* cited by examiner

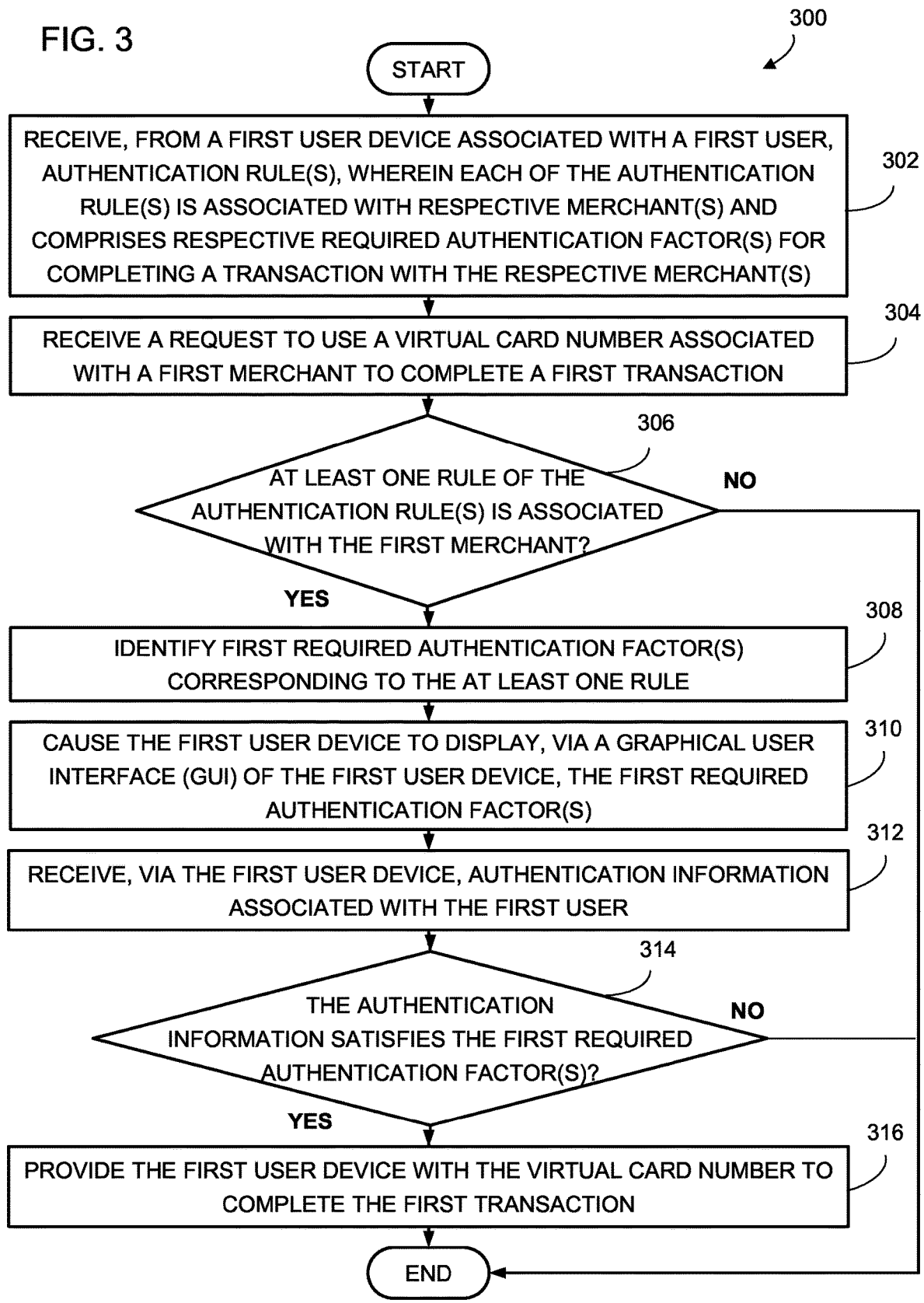

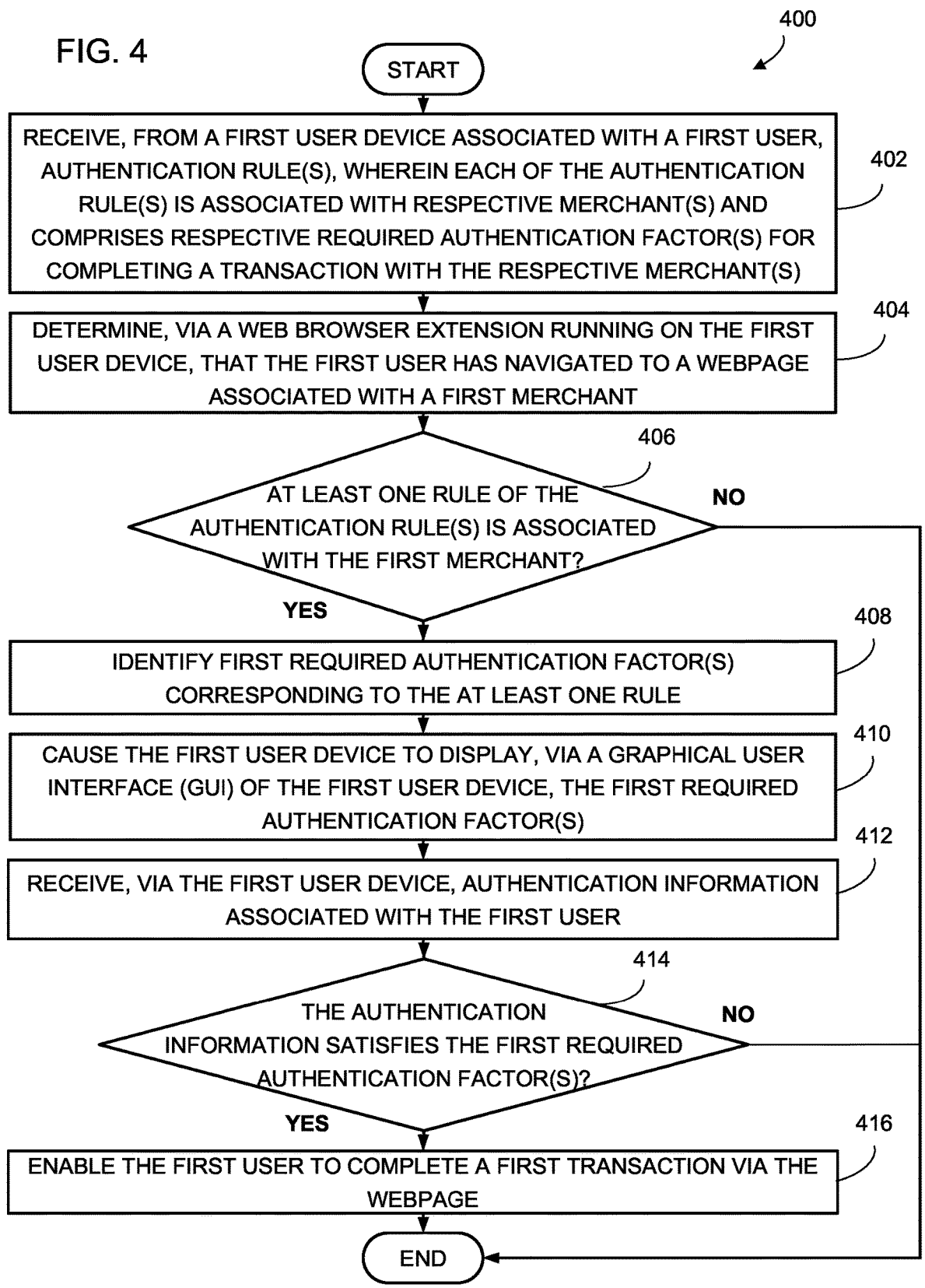

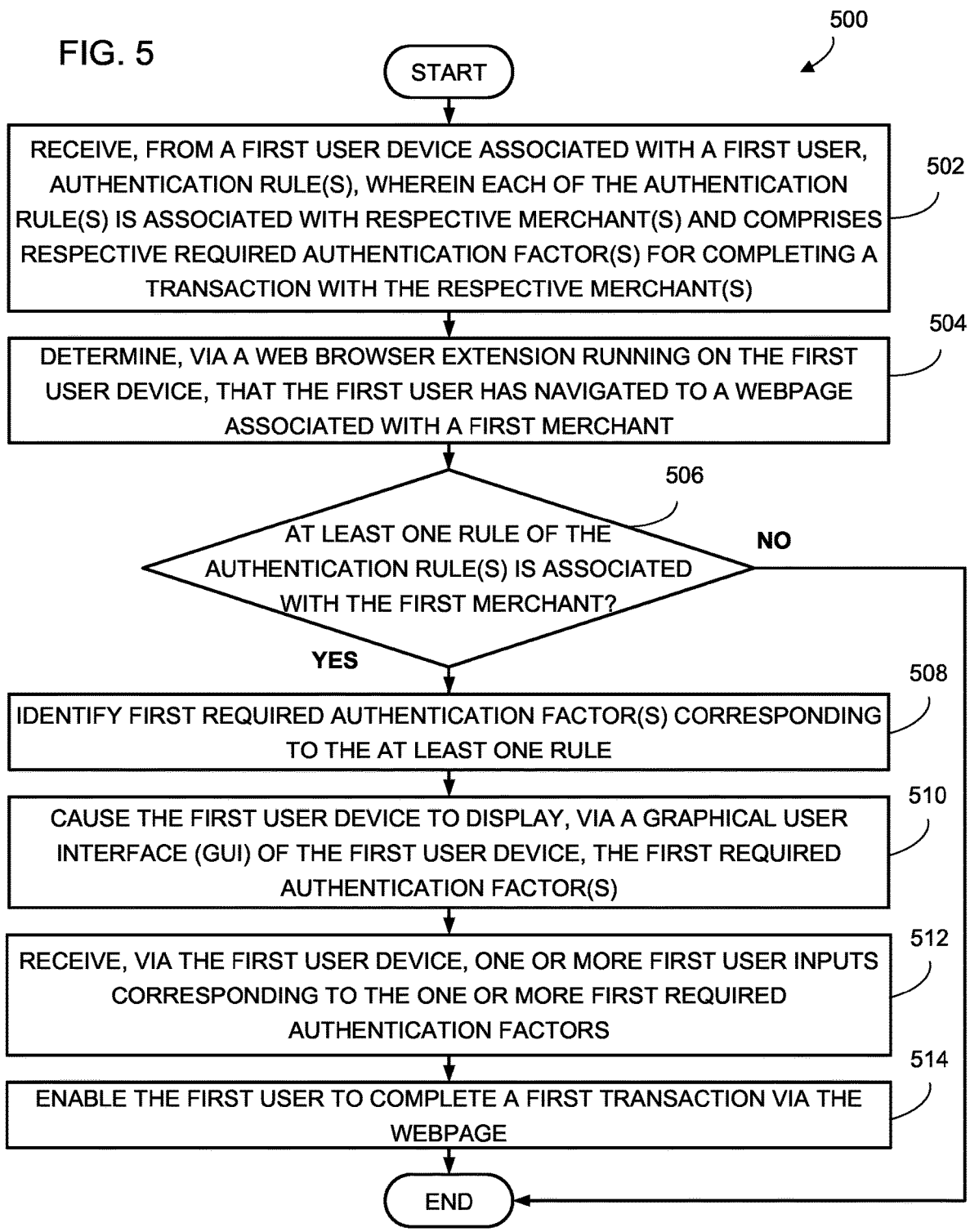

SYSTEMS AND METHODS FOR CONDUCTING REMOTE USER AUTHENTICATION

CROSS-REFERENCE TO RELATED APPLICATIONS

This application is a continuation of, and claims priority under 35 U.S.C. § 120 to, U.S. patent application Ser. No. 17/494,737, filed Oct. 5, 2021, which issues as U.S. Pat. No. 11,854,008 on Dec. 26, 2023, the entire contents of which are fully incorporated herein by reference.

FIELD

The disclosed technology relates to systems and methods for conducting remote authentication, and more particularly, for conducting remote authentication based on identifying a user has navigated to a merchant webpage.

BACKGROUND

Modern society relies heavily on virtual and remote processes. The virtual authentication of people, however, has its disadvantages as it can lead to vulnerabilities with respect to imposters and hacking of users' personal accounts and files. Some traditional virtual systems and methods rely on some form of multi-factor identification, such that an individual must put forth multiple forms of identification, for example a typed password and a response to a mobile phone push notification, in order to complete a transaction (e.g., logging into an online bank account). However, these systems and methods are limited with respect to providing users with options for selecting the number and/or type of authentication factors required for conducting certain transactions, such as merchant-specific transactions.

Accordingly, there is a need for improved systems and methods for conducting remote authentication. Embodiments of the present disclosure are directed to this and other considerations.

SUMMARY

Disclosed embodiments may include a system for conducting remote authentication. The system may include one or more processors, and memory in communication with the one or more processors and storing first instructions that are configured to cause the system to perform a method for conducting remote authentication. The system may receive, from a first user device associated with a first user, one or more authentication rules, wherein each of the one or more authentication rules is associated with one or more respective merchants and comprises one or more respective required authentication factors for completing a transaction with the one or more respective merchants, and wherein the one or more respective required authentication factors comprise one or more of a personal identification number (PIN), a physical token, a facial recognition, a thumbprint image, a retina scan, or combinations thereof. The system may receive a request to use a virtual card number (VCN) associated with a first merchant to complete a first transaction. The system may determine whether at least one rule of the one or more authentication rules is associated with the first merchant. Responsive to determining the at least one rule of the one or more authentication rules is associated with the first merchant, the system may identify one or more first required authentication factors corresponding to the at least one rule. The system may cause the first user device to display, via a graphical user interface (GUI) of the first user device, the one or more first required authentication factors. The system may receive, via the first user device, authentication information associated with the first user. The system may determine whether the authentication information satisfies the one or more first required authentication factors. Responsive to determining that the authentication information satisfies the one or more first required authentication factors, the system may provide the first user device with the VCN to complete the first transaction.

In another embodiment, the system may include one or more processors, and memory in communication with the one or more processors and storing first instructions that are configured to cause the system to perform a method for conducting remote authentication. The system may receive, from a first user device associated with a first user, one or more authentication rules, wherein each of the one or more authentication rules is associated with one or more respective merchants and comprises one or more respective required authentication factors for completing a transaction with the one or more respective merchants, and wherein the one or more respective required authentication factors comprise one or more of a PIN, a physical token, a facial recognition, a thumbprint image, a retina scan, or combinations thereof. The system may determine, via a web browser extension running on the first user device, that the first user has navigated to a webpage associated with a first merchant. The system may determine whether at least one rule of the one or more authentication rules is associated with the first merchant. Responsive to determining the at least one rule of the one or more authentication rules is associated with the first merchant, the system may identify one or more first required authentication factors corresponding to the at least one rule. The system may cause the first user device to display, via a GUI of the first user device, the one or more first required authentication factors. The system may receive, via the first user device, authentication information associated with the first user. The system may determine whether the authentication information satisfies the one or more first required authentication factors. Responsive to determining that the authentication information satisfies the one or more first required authentication factors, the system may enable the first user to complete a first transaction via the webpage.

In another embodiment, the system may include one or more processors, and memory in communication with the one or more processors and storing first instructions that are configured to cause the system to perform a method for conducting remote authentication. The system may receive, from a first user device associated with a first user, one or more authentication rules, wherein each of the one or more authentication rules is associated with one or more respective merchants and comprises one or more respective required authentication factors for completing a transaction with the one or more respective merchants. The system may determine, via a web browser extension running on the first user device, that the first user has navigated to a webpage associated with a first merchant. The system may determine whether at least one rule of the one or more authentication rules is associated with the first merchant. Responsive to determining the at least one rule of the one or more authentication rules is associated with the first merchant, the system may identify one or more first required authentication factors corresponding to the at least one rule. The system may cause the first user device to display, via a GUI of the first user device, the one or more first required authentication factors. The system may receive, via the first user device, one or more first user inputs corresponding to the one or more first required authentication factors. The system may enable the first user to complete a first transaction via the webpage.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 3 is a flow diagram illustrating an exemplary method for conducting remote authentication, in accordance with certain embodiments of the disclosed technology.

FIG. 4 is a flow diagram illustrating an exemplary method for conducting remote authentication, in accordance with certain embodiments of the disclosed technology.

FIG. 5 is a flow diagram illustrating an exemplary method for conducting remote authentication, in accordance with certain embodiments of the disclosed technology.

DETAILED DESCRIPTION

Examples of the present disclosure relate to systems and methods for conducting remote authentication. In particular, the disclosed technology relates to systems and methods for receiving one or more authentication rules, each rule pertaining to one or more respective merchants and one or more respective required authentication factors for completing a transaction with the respective merchants, identifying a user has navigated to a merchant webpage, and enabling the user to complete a transaction on the merchant webpage upon receiving authentication information from the user that satisfies the authentication rule applicable to that merchant. The systems and methods described herein are thus necessarily rooted in computer and technology as they utilize multi-factor authentication to conduct remote, i.e., virtual, authentication of a user, and in particular, on a merchant-by-merchant basis.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
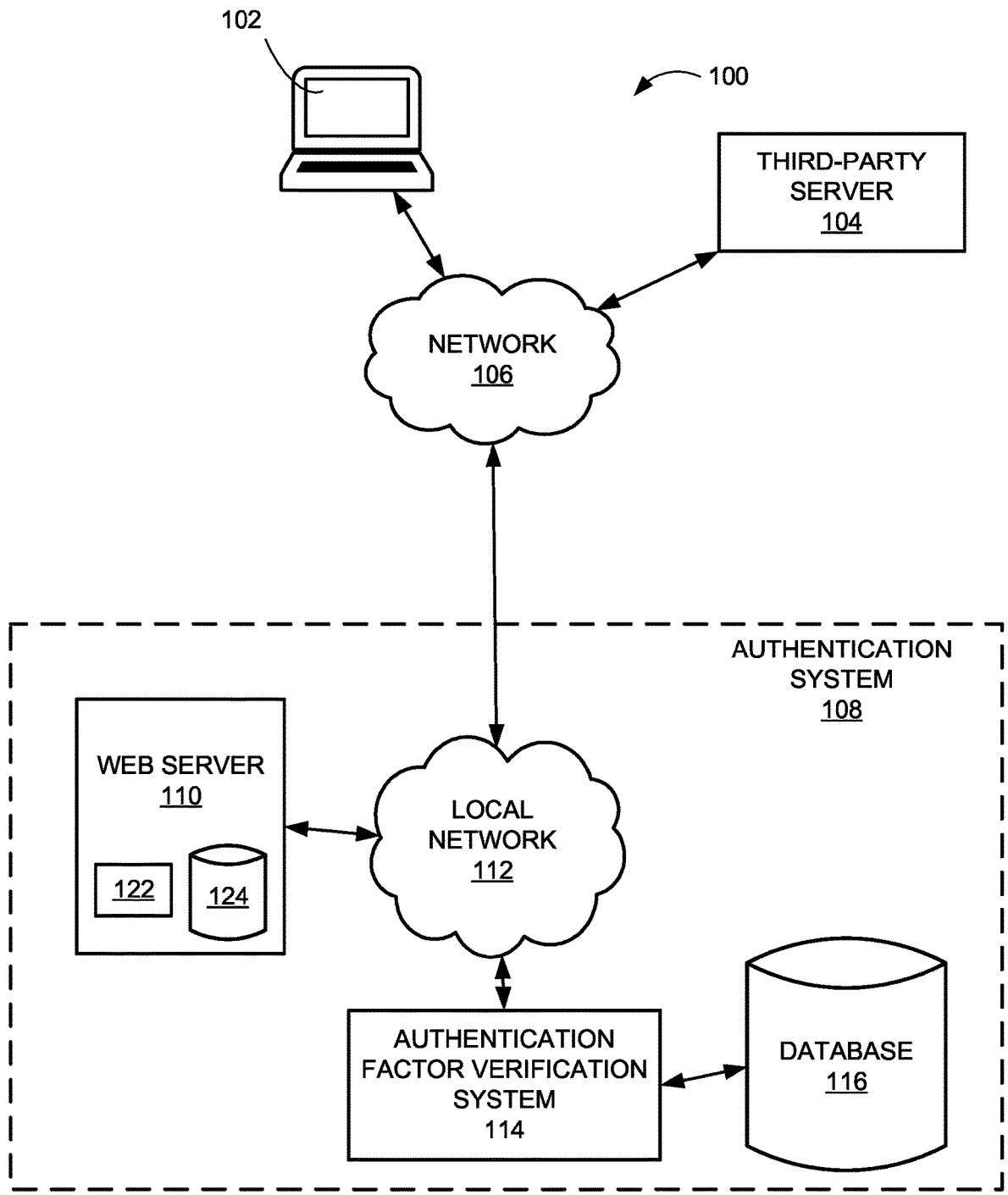
FIG. 1 is a block diagram of an example system that may be used to conduct remote authentication, according to an example implementation of the disclosed technology.

FIG. 1 is a block diagram of an example system that may be used to conduct remote authentication, according to an example implementation of the disclosed technology. The components and arrangements shown in FIG. 1 are not intended to limit the disclosed embodiments as the components used to implement the disclosed processes and features may vary. As shown, authentication system 108 may interact with a user device 102 and/or a third-party server 104 via a network 106. In certain example implementations, the authentication system 108 may include a local network 112, an authentication factor verification system 114, a web server 110, and a database 116.

In some embodiments, a user may operate the user device 102. User device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of the authentication system 108. In some embodiments, user device 102 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the authentication system 108. According to some embodiments, user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may include any type of computer networking arrangement used to exchange data. For example, network 106 may be the Internet, a private data network, virtual private network using a public network, and/or other suitable connection(s) that enable(s) components in the system 100 environment to send and receive information between the components of system 100. Network 106 may also include a public switched telephone network ("PSTN") and/or a wireless network.

Authentication system 108 may be associated with and optionally controlled by one or more entities such as a business, corporation, individual, partnership, or any other entity that provides one or more of goods, services, and consultations to individuals such as customers. In some embodiments, authentication system 108 may be controlled by a third party on behalf of another business, corporation, individual, partnership. Authentication system 108 may include one or more servers and computer systems for performing one or more functions associated with products and/or services that the organization provides.

Web server 110 may include a computer system configured to generate and provide one or more websites accessible to customers, as well as any other individuals involved in access system 100's normal operations. Web server 110 may include a computer system configured to receive communications from user device 102 via for example, a mobile application, a chat program, an instant messaging program, a voice-to-text program, an SMS message, email, or any other type or format of written or electronic communication. Web server 110 may have one or more processors 122 and one or more web server databases 124, which may be any suitable repository of website data. Information stored in web server 110 may be accessed (e.g., retrieved, updated, and added to) via local network 112 and/or network 106 by one or more devices or systems (e.g., authentication factor verification system 114) of system 100. In some embodiments, web server 110 may host websites or applications that may be accessed by user device 102. For example, web server 110 may host a financial service provider website that a user device may access by providing an attempted login that are authenticated by authentication factor verification system 114. According to some embodiments, web server 110 may include software tools, similar to those described with respect to user device 102, that may allow web server 110 to obtain network identification data from user device 102.

Local network 112 may include any type of computer networking arrangement used to exchange data in a localized area, such as WiFi, Bluetooth™ Ethernet, and other suitable network connections that enable components of authentication system 108 to interact with one another and to connect to network 106 for interacting with components in the system 100 environment. In some embodiments, local network 112 may include an interface for communicating with or linking to network 106. In other embodiments, certain components of authentication system 108 may communicate via network 106, without a separate local network 112.

In accordance with certain example implementations of the disclosed technology, authentication system 108 may include one or more computer systems configured to compile data from a plurality of sources, for example, authentication factor verification system 114, web server 110, and/or database 116. Authentication factor verification system 114 may correlate compiled data, analyze the compiled data, arrange the compiled data, generate derived data based on the compiled data, and store the compiled and derived data in a database such as database 116. According to some embodiments, database 116 may be a database associated with an organization and/or a related entity that stores a variety of information relating to customers, transactions, ATM, and business operations. Database 116 may also serve as a back-up storage device and may contain data and information that is also stored on, for example, database 260, as discussed below with reference to FIG. 2.

Although the preceding description describes various functions of a web server 110, an authentication factor verification system 114, and a database 116, in some embodiments, some or all of these functions may be carried out by a single computing device or a plurality of computing devices in a (cloud) serverless system.

Figure 2:
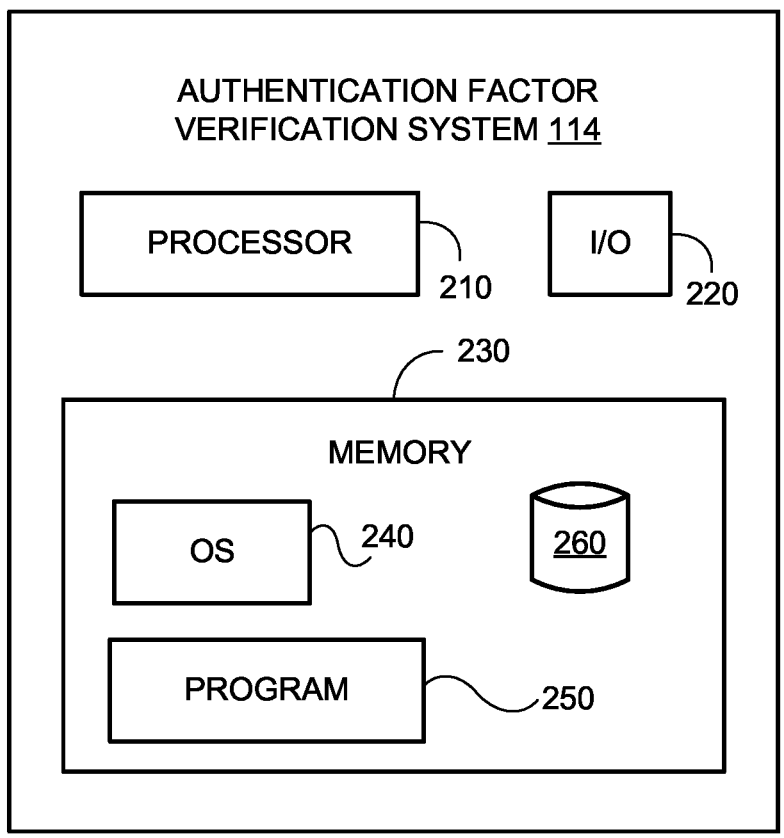
FIG. 2 is a block diagram of an example authentication factor verification system used to remotely authenticate a user, according to an example implementation of the disclosed technology.

An example embodiment of authentication factor verification system 114 is shown in more detail in FIG. 2. According to some embodiments, user device 102 and web server 110, as depicted in FIG. 1 and described above, may have a similar structure and components that are similar to those described with respect to authentication factor verification system 114 shown in FIG. 2. As shown, authentication factor verification system 114 may include a processor 210, an input/output ("I/O") device 220, a memory 230 containing an operating system ("OS") 240, a program 250, and a database 260.

In certain example implementations, authentication factor verification system 114 may be a single server or may be configured as a distributed computer system including multiple servers or computers that interoperate to perform one or more of the processes and functionalities associated with the disclosed embodiments. In some embodiments, authentication factor verification system 114 may be one or more servers from a serverless or scaling server system. In some embodiments, authentication factor verification system 114 may further include a peripheral interface, a transceiver, a mobile network interface in communication with processor 210, a bus configured to facilitate communication between the various components of authentication factor verification system 114, and a power source configured to power one or more components of authentication factor verification system 114.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a USB port, a micro-USB port, a high-definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: RFID, NFC, Bluetooth™, BLE, WiFi™, ZigBee™, ABC protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within memory 230.

Processor 210 may be one or more known processing devices, such as, but not limited to, a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc., multiple software processes, applications, programs, etc. One of ordinary skill in the art would understand that other types of processor arrangements could be implemented that provide for the capabilities disclosed herein.

In accordance with certain example implementations of the disclosed technology, authentication factor verification system 114 may include one or more storage devices configured to store information used by processor 210 (or other components) to perform certain functions related to the disclosed embodiments. In one example, authentication factor verification system 114 may include memory 230 that includes instructions to enable processor 210 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, authentication factor verification system 114 may include a memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, authentication factor verification system 114 may include memory 230 that may include one or more programs 250 to perform one or more functions of the disclosed embodiments. For example, in some embodiments, authentication factor verification system 114 may additionally manage dialogue and/or other interactions with the customer via a program 250.

Processor 210 may execute one or more programs located remotely from authentication factor verification system 114. For example, authentication factor verification system 114 may access one or more remote programs that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include database 260 for storing related data to enable authentication factor verification system 114 to perform one or more of the processes and functionalities associated with the disclosed embodiments.

Authentication factor verification system 114 may also be communicatively connected to one or more memory devices (e.g., databases) locally or through a network. The remote memory devices may be configured to store information and may be accessed and/or managed by authentication factor verification system 114. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Authentication factor verification system 114 may also include one or more I/O devices 220 that may comprise one or more interfaces for receiving signals or input from devices and providing signals or output to one or more devices that allow data to be received and/or transmitted by authentication factor verification system 114. For example, authentication factor verification system 114 may include interface components, which may provide interfaces to one or more input devices, such as one or more keyboards, mouse devices, touch screens, track pads, trackballs, scroll wheels, digital cameras, microphones, sensors, and the like, that enable authentication factor verification system 114 to receive data from a user (such as, for example, via user device 102).

In example embodiments of the disclosed technology, authentication factor verification system 114 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While authentication factor verification system 114 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of authentication factor verification system 114 may include a greater or lesser number of components than those illustrated.

FIG. 3 provides a flow diagram illustrating an exemplary method 300 for conducting remote authentication, in accordance with certain embodiments of the disclosed technology. Method 300 may be performed by one or more components of system 100 (e.g., authentication system 108 or user device 102), as described above with respect to FIGS. 1 and 2.

In block 302 of FIG. 3, the system (e.g., via authentication system 108) may receive, from a first user device (e.g., a laptop, mobile phone, etc.) associated with a first user, one or more authentication rules, wherein each of the one or more authentication rules is associated with one or more respective merchants and comprises one or more respective required authentication factors for completing a transaction with the one or more respective merchants, and wherein the one or more respective required authentication factors comprise one or more of a PIN, a physical token, a facial recognition, a thumbprint image, a retina scan, or combinations thereof. That is, a first user may prefer to vary or customize the level of authentication required (e.g., the number and/or type of required authentication factors) based on the type of merchant with whom the first user transacts, for example, based on the frequency at which the first user transacts with a given merchant or the value (e.g., dollar amount) of the products and/or services offered by a given merchant. For example, the first user may specify an authentication rule applicable to any transactions conducted on the first user's Amazon.com account, such that when the system recognizes the first user's Amazon.com account being used, the applicable authentication rule requires two required authentication factors, e.g., a PIN and a physical token, be provided and verified prior to allowing a transaction to be completed. The first user may specify another authentication rule applicable to any transactions conducted on the first user's Verizon.com account, such that when the system recognizes the first user's Verizon.com account being used, the applicable authentication rule requires three required authentication factors, e.g., a PIN, a physical token, and a thumbprint image, be provided and verified prior to allowing a transaction to be completed. A physical token may be a physical or virtual device that is capable of generating a one-time pin (OTP) (e.g., Google Authenticator™, RSA token generator, etc.).

In some embodiments, the system my receive the one or more authentication rules from a first user by, for example, providing a GUI within a mobile application on a mobile device wherein the first user may input each of the one or more authentication rules, and the respective authentication factor(s) and merchant(s). In some embodiments, the system may store each of the first user's specified authentication rules for later retrieval and application when the system identifies user activity on a given merchant's webpage, as described further below.

In block 304, the system (e.g., via authentication system 108) may receive a request to use a VCN associated with a first merchant to complete a transaction. That is, a first user may navigate to a webpage associated with a merchant and attempt to use a VCN and/or generate a new VCN (e.g., via a web browser extension associated with a financial institution) to complete a transaction on the merchant's webpage. The system may be configured to recognize when a first user has navigated to a webpage associated with a merchant, and to identify the specific merchant associated with the webpage, based on recognizing the first user is attempting to use and/or generate a VCN for that merchant. In some embodiments, the system may be configured to identify when a first user has begun running a web browser extension via a GUI of his or her mobile device (e.g., laptop) as the web browser extension may be owned and/or operated by a component of the system (e.g., third-party server 104 or web server 110).

In decision block 306, the system (e.g., via authentication system 108) may determine whether at least one rule of the one or more authentication rules is associated with the first merchant. That is, once the system has identified that the first user has navigated to a certain merchant webpage, as described above, the system may be configured to filter through each of the stored authentication rules to determine whether any one rule is applicable to the merchant whose webpage the first user is currently on.

In response to determining none of the stored authentication rules applies to the first merchant, the system may be configured to pause or stop the authentication process so as to allow the first user to proceed with any transaction on the first merchant's webpage without needing to authenticate him or herself.

However, in response to determining at least one rule of the one or more authentication rules is associated with the first merchant, in block 308, the system (e.g., via authentication factor verification system 114) may identify one or more first required authentication factors corresponding to the at least one rule. That is, as described above with respect to block 302, the authentication rule identified as being applicable to the first merchant may be configured such that it includes one or more required authentication factors that the first user must provide prior to being able to complete a transaction on the first merchant's webpage.

In block 310, the system (e.g., via authentication factor verification system 114) may cause the first user device to display, via a GUI of the first user device, the one or more first required authentication factors. For example, the system may be configured to transmit a pop-up message via the GUI of the first user device to notify the first user that he or she must provide the one or more first required authentication factors before proceeding to conduct a transaction. As described above with respect to block 302, these authentication factors may comprise one or more of a PIN, a physical token, a facial recognition, a thumbprint image, a retina scan, or combinations thereof.

In some embodiments, the system may transmit a notification to a second user device associated with the first user, the notification providing the one or more first required authentication factors. For example, the first user device, as referenced above, may be the first user's computer (e.g., laptop), while the second user device may be the first user's mobile phone. The system may be configured to not only notify the first user via his or her computer (e.g., via a GUI) that he or she must provide the one or more first required authentication factors, but also (or in lieu of) to notify him or her via his or her mobile phone (e.g., via a push notification).

In block 312, the system (e.g., via authentication factor verification system 114) may receive, via the first user device, authentication information associated with the first user. Each of the above-mentioned authentication factors may be received by the system in multiple ways. For example, the first user may enter, e.g., type, a PIN into a GUI of the first user's mobile device (e.g., a laptop). The first user may utilize an image capture device, e.g., a camera, on the first user's mobile device to provide a facial recognition or scan. The first user may utilize a thumbprint scanner connected to the first user's mobile device to provide a thumbprint image. The first user may utilize a retina scanner connected to the first user's mobile device to provide a retina scan. Alternatively, for one or more of the above-mentioned authentication factors, the first user may run an application via a GUI of the first user's mobile device, wherein the application itself provides different types of biometric scanners that may require the use of the mobile device's internal image capture device (e.g., a camera) to operate fully. In some embodiments, the first user may provide the one or more authentication factors by utilizing a removeable memory device or card that contains a private key to prove the first user's identity.

In decision block 314, the system (e.g., via authentication factor verification system 114) may determine whether the authentication information satisfies the one or more first required authentication factors. That is, the system may be configured to have previously stored the above-mentioned authentication factors associated with the first user, such as when the first user initially set up his or her customizable selections of how many and/or which authentication factors should be provided with each established authentication rule, as described above. The system may then be configured to, upon receiving each authentication factor from the first user, compare the received authentication factor to its respective stored authentication factor to determine whether there is a match between them so as to accurately authenticate the first user's identity.

In response to determining the received authentication information does not satisfy the one or more first required authentication factors, the system may pause or end the authentication process, e.g., by transmitting a message to the first user indicating the first user's identity was not properly identified. In some embodiments, the system may be configured to enable the first user to re-provide previously provided authentication information (e.g., re-take a retina scan), or to provide additional authentication information (e.g., additional authentication factors not yet provided to the system). In some embodiments, the system may be configured to re-issue an authentication request, e.g., via the first user device, to provide the authentication information. In some embodiments, whether the first user may re-provide authentication information or provide additional authentication information may also be customizable by the first user with each established authentication rule.

However, in response to determining the received authentication information satisfies the one or more first required authentication factors, in block 316, the system (e.g., via authentication system 108) may provide the first user device with the VCN to complete the first transaction. That is, as described above with respect to block 304, the system may be configured to now enable the first user to use a VCN and/or generate a new VCN to complete a transaction on the merchant's webpage.

Method 400 of FIG. 4 is similar to method 300 of FIG. 3, except that method 400 includes identifying a user has navigated to a merchant webpage via a web browser extension running on the user's device, while method 300 includes such identification based on receiving a request to use a VCN to complete a transaction on a merchant webpage. The descriptions of block 402, 406, 408, 410, 412, and 414 are the same as or similar to the respective descriptions of blocks 302, 306, 308, 310, 312, and 314 and as such, are not repeated herein for brevity.

In block 404 of FIG. 4, the system (e.g., via authentication system 108) may determine, via a web browser extension running on the first user device, that the first user has navigated to a webpage associated with a first merchant. That is, the first user may have previously downloaded a web browser extension (e.g., owned and/or operated by a component of system 100, e.g., third-party server 104 or web server 110) such that each time the first user navigates to a particular merchant's webpage, the system can identify the specific merchant, and retrieve one or more authentication rules associated with that merchant. The first user may have downloaded this web browser extension to ensure an added layer of security across the first user's various online merchant accounts such that persons other than the first user would not be able to access the first user's accounts for completing merchant transactions without the knowledge of the first user.

In block 416 of FIG. 4, in response to determining the received authentication information satisfies the one or more first required authentication factors, the system (e.g., via authentication system 108) may enable the first user to complete a first transaction via the webpage. That is, once the first user has been properly authenticated, as described above with respect to block 314, the system may allow the first user to complete a transaction on a given merchant's webpage. For example, the system may be configured to grey out one or more user inputs (e.g., a "checkout" button, or a text field for entering a credit card number) on the merchant webpage prior to receiving the required authentication information from the first user. Upon receiving the required authentication information and determining it to satisfy the one or more first required authentication factors, the system may enable the first user to access the one or more user inputs necessary for completing the transaction.

Method 500 of FIG. 5 is also similar to method 300 of FIG. 3, except that method 500 includes receiving user inputs corresponding to the required authentication factors, while method 300 includes receiving authentication information and determining whether it satisfies the required authentication factors. The descriptions of blocks 502, 506, 508, 510, and 512 are the same as or similar to the respective descriptions of blocks 302, 306, 308, 310, and 312 of method 300 and as such, are not repeated herein for brevity. Additionally, the description of blocks 504 and 514 of FIG. 5 are the same as or similar to the respective descriptions of blocks 404 and 416 of FIG. 4 and as such, are not repeated herein for brevity.

EXAMPLE USE CASE

The following example use case describes an example of a typical user flow pattern. This section is intended solely for explanatory purposes and not in limitation.

In one example, a user may navigate, via a web browser on her laptop computer, to her Amazon.com account. She may add multiple items to her cart and then hit the "checkout" button. When she gets to the "checkout" page, she may initiate the use of a VCN, e.g., via a web browser extension associated with a financial institution, for purposes of paying for the items in her cart. The system may be configured to recognize that the user has initiated the use of the VCN to then be able to identify the fact that the user is on the Amazon.com webpage. The system (e.g., via authentication factor verification system 114) may then search through a grouping of stored authentication rules previously established by the user, wherein each of the authentication rules comprises one or more required authentication factors that must be provided before completing a transaction on a respective merchant's webpage. The system (e.g., via authentication factor verification system 114) may identify that one of the authentication rules previously established by the user corresponds to Amazon.com. The system (e.g., via authentication factor verification system 114) may then retrieve that particular rule and determine that the rule requires the user to enter a PIN and provide a retina scan prior to completing her transaction of the multiple items in her cart. The system (e.g., via authentication factor verification system 114) may transmit a pop-up message, via a GUI of the user's laptop, to advise the user that she must enter her PIN and provide a retina scan. The user may then type her previously provided PIN into the GUI of her laptop and provide a retina scan by using an external retina scanner connected to her laptop. Once the user provides both the PIN and retina scan, the system may determine whether the PIN and retina scan match a previously stored PIN and retina scan associated with the user. The system (e.g., via authentication factor verification system 114) may determine the provided and stored PIN and retina scans match, and then may transmit another message to the user, via the GUI of the user's laptop, indicating her provided authentication factors were accepted. The user may then be able to use the previously initiated VCN to complete the purchase of the items in her Amazon cart.

In some examples, disclosed systems or methods may involve one or more of the following clauses:

Clause 1: A system comprising: one or more processors; and memory in communication with the one or more processors and storing instructions that are configured to cause the system to: receive, from a first user device associated with a first user, one or more authentication rules, wherein each of the one or more authentication rules is associated with one or more respective merchants and comprises one or more respective required authentication factors for completing a transaction with the one or more respective merchants, and wherein the one or more respective required authentication factors comprise one or more of a personal identification number (PIN), a physical token, a facial recognition, a thumbprint image, a retina scan, or combinations thereof; receive a request to use a virtual card number associated with a first merchant to complete a first transaction; determine whether at least one rule of the one or more authentication rules is associated with the first merchant; responsive to determining the at least one rule of the one or more authentication rules is associated with the first merchant, identify one or more first required authentication factors corresponding to the at least one rule; cause the first user device to display, via a graphical user interface (GUI) of the first user device, the one or more first required authentication factors; receive, via the first user device, authentication information associated with the first user; determine whether the authentication information satisfies the one or more first required authentication factors; and responsive to determining that the authentication information satisfies the one or more first required authentication factors, provide the first user device with the virtual card number to complete the first transaction.

Clause 2: The system of clause 1, wherein the instructions are further configured to cause the system to: transmit a notification to a second user device associated with the first user, the notification providing the one or more first required authentication factors.

Clause 3: The system of clause 2, wherein the first user device is a computer and the second user device is a mobile phone.

Clause 4: The system of clause 1, wherein the one or more respective required authentication factors are customizable by the first user.

Clause 5: The system of clause 1, wherein a total number of the one or more respective required authentication factors for completing the transaction is based on a total dollar amount of the transaction.

Clause 6: A system comprising: one or more processors; and memory in communication with the one or more processors and storing instructions that are configured to cause the system to: receive, from a first user device associated with a first user, one or more authentication rules, wherein each of the one or more authentication rules is associated with one or more respective merchants and comprises one or more respective required authentication factors for completing a transaction with the one or more respective merchants, and wherein the one or more respective required authentication factors comprise one or more of a personal identification number (PIN), a physical token, a facial recognition, a thumbprint image, a retina scan, or combinations thereof; determine, via a web browser extension running on the first user device, that the first user has navigated to a webpage associated with a first merchant; determine whether at least one rule of the one or more authentication rules is associated with the first merchant; responsive to determining the at least one rule of the one or more authentication rules is associated with the first merchant, identify one or more first required authentication factors corresponding to the at least one rule; cause the first user device to display, via a graphical user interface (GUI) of the first user device, the one or more first required authentication factors; receive, via the first user device, authentication information associated with the first user; determine whether the authentication information satisfies the one or more first required authentication factors; and responsive to determining that the authentication information satisfies the one or more first required authentication factors, enable the first user to complete a first transaction via the webpage.

Clause 7: The system of clause 6, wherein enabling the first user to complete the first transaction via the webpage comprises enabling the first user to generate a new virtual card number associated with the first merchant.

Clause 8: The system of clause 6, wherein enabling the first user to complete the first transaction via the webpage comprises enabling the first user to utilize a virtual card number associated with the first merchant.

Clause 9: The system of clause 6, wherein the instructions are further configured to cause the system to: transmit a notification to a second user device associated with the first user, the notification providing the one or more first required authentication factors.

Clause 10: The system of clause 9, wherein the first user device is a computer and the second user device is a mobile phone.

Clause 11: The system of clause 6, wherein the one or more respective required authentication factors are customizable by the first user.

Clause 12: The system of clause 6, wherein a total number of the one or more respective required authentication factors for completing the transaction is based on a total dollar amount of the transaction.

Clause 13: A system comprising: one or more processors; and memory in communication with the one or more processors and storing instructions that are configured to cause the system to: receive, from a first user device associated with a first user, one or more authentication rules, wherein each of the one or more authentication rules is associated with one or more respective merchants and comprises one or more respective required authentication factors for completing a transaction with the one or more respective merchants; determine, via a web browser extension running on the first user device, that the first user has navigated to a webpage associated with a first merchant; determine whether at least one rule of the one or more authentication rules is associated with the first merchant; responsive to determining the at least one rule of the one or more authentication rules is associated with the first merchant, identify one or more first required authentication factors corresponding to the at least one rule; cause the first user device to display, via a graphical user interface (GUI) of the first user device, the one or more first required authentication factors; receive, via the first user device, one or more first user inputs corresponding to the one or more first required authentication factors; and enable the first user to complete a first transaction via the webpage.

Clause 14: The system of clause 13, wherein the one or more respective required authentication factors comprise one or more of a personal identification number (PIN), a physical token, a facial recognition, a thumbprint image, a retina scan, or combinations thereof.

Clause 15: The system of clause 13, wherein enabling the first user to complete the first transaction via the webpage comprises enabling the first user to generate a new virtual card number associated with the first merchant.

Clause 16: The system of clause 13, wherein enabling the first user to complete the first transaction via the webpage comprises enabling the first user to utilize a virtual card number associated with the first merchant.

Clause 17: The system of clause 13, wherein the instructions are further configured to cause the system to: transmit a notification to a second user device associated with the first user, the notification providing the one or more first required authentication factors.

Clause 18: The system of clause 17, wherein the first user device is a computer and the second user device is a mobile phone.

Clause 19: The system of clause 13, wherein the one or more respective required authentication factors are customizable by the first user.

Clause 20: The system of clause 13, wherein a total number of the one or more respective required authentication factors for completing the transaction is based on a total dollar amount of the transaction.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for user authentication comprising:
   one or more processors; and
   a memory in communication with the one or more processors and storing instructions that, when executed by the one or more processors, are configured to cause the system to:
   determine, via a web browser extension running on a first user device, that a first user has navigated to a webpage associated with a first merchant;

receive, via a graphical user interface (GUI) of the first user device, a request to use a virtual card number associated with the first merchant to complete a first transaction;
determine whether at least one rule of one or more authentication rules is associated with the first merchant, wherein the at least one rule corresponds to a required level of authentication based on a merchant type associated with the first merchant, and wherein the one or more authentication rules comprise one or more respective required authentication factors;
responsive to determining the at least one rule of the one or more authentication rules is associated with the first merchant, identify one or more first required authentication factors corresponding to the at least one rule, wherein the required level of authentication comprises one or more of a type and a total number of the one or more first required authentication factors, and wherein the type and the total number of the one or more first required authentication factors are stored along with the at least one rule;
receive, via the first user device, authentication information associated with the first user;
determine whether the authentication information satisfies the one or more first required authentication factors; and
responsive to determining the authentication information satisfies the one or more first required authentication factors:
direct the first user to the web browser extension to generate the virtual card number, wherein the web browser extension is external to the first merchant and generates the virtual card number;
modify the GUI of the first user device such that a previously greyed out user input object is enabled to receive user input; and
enable the first user to complete the first transaction by entering the generated virtual card number into the enabled user input object.

2. The system of claim 1, wherein the instructions are further configured to cause the system to:
transmit a notification to a second user device associated with the first user, the notification providing the one or more first required authentication factors.

3. The system of claim 2, wherein the first user device is a computer and the second user device is a mobile phone.

4. The system of claim 1, wherein the one or more respective required authentication factors are customizable by the first user.

5. The system of claim 1, wherein a total number of the one or more respective required authentication factors for completing the first transaction is based on a total dollar amount of the first transaction.

6. A system for user authentication comprising:
one or more processors; and
a memory in communication with the one or more processors and storing instructions that, when executed by the one or more processors, are configured to cause the system to:
determine, via a web browser extension running on a first user device, that a first user has navigated to a webpage associated with a first merchant, wherein the web browser extension is external to the first merchant;
determine whether at least one rule of one or more authentication rules is associated with the first merchant, wherein the at least one rule corresponds to a required level of authentication based on a merchant type associated with the first merchant, and wherein the one or more authentication rules comprise one or more respective required authentication factors;
responsive to determining the at least one rule of the one or more authentication rules is associated with the first merchant,
identify one or more first required authentication factors corresponding to the at least one rule, wherein the required level of authentication comprises one or more of a type and a total number of the one or more first required authentication factors, and wherein the type and the total number of the one or more first required authentication factors are stored along with the at least one rule;
receive, via the first user device, authentication information associated with the first user;
determine whether the authentication information satisfies the one or more first required authentication factors; and
responsive to determining the authentication information satisfies the first required authentication factors:
modify a graphical user interface (GUI) of the first user device such that a previously greyed out user input object is enabled to receive user input;
direct the first user to the web browser extension to generate a first virtual card number, wherein the web browser extension generates the first virtual card number; and
enable the first user to complete a first transaction by entering the first virtual card number into the enabled user input object.

7. The system of claim 6, wherein enabling the first user to complete the first transaction via the webpage comprises enabling the first user to generate a new virtual card number associated with the first merchant.

8. The system of claim 6, wherein enabling the first user to complete the first transaction via the webpage comprises enabling the first user to utilize a virtual card number associated with the first merchant.

9. The system of claim 6, wherein the instructions are further configured to cause the system to:
transmit a notification to a second user device associated with the first user, the notification providing the one or more first required authentication factors.

10. The system of claim 9, wherein the first user device is a computer and the second user device is a mobile phone.

11. The system of claim 6, wherein the one or more respective required authentication factors are customizable by the first user.

12. The system of claim 6, wherein a total number of the one or more respective required authentication factors for completing the first transaction is based on a total dollar amount of the first transaction.

13. A system for user authentication comprising:
one or more processors; and
a memory in communication with the one or more processors and storing instructions that, when executed by the one or more processors, are configured to cause the system to:
determine, via a web browser extension running on a first user device, that a first user has navigated to a webpage associated with a first merchant, wherein the web browser extension is external to the first merchant;

determine whether at least one rule of one or more stored authentication rules is associated with the first merchant, wherein the at least one rule corresponds to a required level of authentication based on a merchant type associated with the first merchant, and wherein the one or more stored authentication rules comprise one or more respective required authentication factors;

responsive to determining the at least one rule of the one or more stored authentication rules is associated with the first merchant, identify one or more first required authentication factors corresponding to the at least one rule;

receive, via the first user device, one or more first user inputs corresponding to the one or more first required authentication factors, wherein the required level of authentication comprises one or more of a type and a total number of the one or more first required authentication factors, and wherein the type and the total number of the one or more first required authentication factors are stored along with the at least one rule;

determine whether the one or more first user inputs satisfy the one or more first required authentication factors; and responsive to determining the one or more first user inputs satisfy the one or more first required authentication factors:

modify a graphical user interface (GUI) of the first user device such that a previously disabled user input object is enabled to receive user input;

direct the first user to the web browser extension to generate a virtual card number, wherein the web browser extension generates the virtual card number; and enable the first user to complete a first transaction via the webpage by entering the generated virtual card number into the enabled user input object.

14. The system of claim 13, wherein the one or more respective required authentication factors comprise one or more of a personal identification number (PIN), a physical token, a facial recognition, a thumbprint image, a retina scan, or combinations thereof.

15. The system of claim 13, wherein enabling the first user to complete the first transaction via the webpage comprises enabling the first user to generate a new virtual card number associated with the first merchant.

16. The system of claim 13, wherein enabling the first user to complete the first transaction via the webpage comprises enabling the first user to utilize a virtual card number associated with the first merchant.

17. The system of claim 13, wherein the instructions are further configured to cause the system to:

transmit a notification to a second user device associated with the first user, the notification providing the one or more first required authentication factors.

18. The system of claim 13, wherein a total number of the one or more respective required authentication factors for completing the first transaction is based on a total dollar amount of the first transaction.

\* \* \* \* \*